US012602679B2

(12) United States Patent　　　　(10) Patent No.:　US 12,602,679 B2

Chouksey　　　　　　　　　　　　(45) Date of Patent:　Apr. 14, 2026

(54) MULTI-FUNCTIONAL SHOPPING CART, SYSTEM, AND METHOD FOR SHOPPING

(71) Applicant: Avadh Kishor Chouksey, Jabalpur (IN)

(72) Inventor: Avadh Kishor Chouksey, Jabalpur (IN)

( * ) Notice: Subject to any disclaimer, the term of this patent is extended or adjusted under 35 U.S.C. 154(b) by 372 days.

(21) Appl. No.: 18/288,437

(22) PCT Filed: May 13, 2022

(86) PCT No.: PCT/IB2022/054479

§ 371 (c)(1),
(2) Date: Oct. 26, 2023

(87) PCT Pub. No.: WO2022/243819

PCT Pub. Date: Nov. 24, 2022

(65) Prior Publication Data

US 2025/0005551 A1　　　Jan. 2, 2025

(30) Foreign Application Priority Data

May 16, 2021　(IN) ............................... 20212021984

(51) Int. Cl.
*G06Q 20/20*　　　(2012.01)
*B62B 3/14*　　　(2006.01)
*B62B 5/00*　　　(2006.01)

(52) U.S. Cl.
CPC ............. *G06Q 20/208* (2013.01); *B62B 3/14* (2013.01); *B62B 5/00* (2013.01); *B62B 5/0096* (2013.01)

(58) Field of Classification Search
CPC .......... G06Q 20/208; B62B 3/14; B62B 5/00; B62B 5/0096
See application file for complete search history.

(56) References Cited

U.S. PATENT DOCUMENTS

| | | | | |
|---|---|---|---|---|
| 6,910,697 | B2 * | 6/2005 | Varatharajah | .......... G06Q 20/20 705/16 |
| 9,463,927 | B1 * | 10/2016 | Theobald | ............. B65G 1/1373 |
| 11,453,129 | B2 * | 9/2022 | Paepcke | .................. G06F 3/017 |
| 2016/0364786 | A1 * | 12/2016 | Wankhede | ........... G07G 1/0036 |

FOREIGN PATENT DOCUMENTS

| | | | | | |
|---|---|---|---|---|---|
| CN | 110774291 | A | * | 2/2020 | ............. B25J 11/00 |
| CN | 108454657 | B | * | 12/2020 | ......... G06Q 30/0281 |

* cited by examiner

*Primary Examiner* — Gene O Crawford

(74) *Attorney, Agent, or Firm* — Boris Leschinsky

(57)　　　　ABSTRACT

A multi-functional shopping cart (100) for shopping includes a main storage (102) adapted for storage of items; a top cover (110) disposed on top of, and fixedly coupled to the main storage; a gate (112) provided at the main storage; a crane (130) provided within the main storage and configured to pick up items from the gate and move them to a designated location; an optical device (122) configured to detect the items. The shopping cart further includes a computing device (202) configured to: detect the items; extract one or more attributes of the items; operate the gate to allow the items to enter the main storage; operate the crane to transport the items to their designated location; and transmit the one or more attributes and a log of operations to a central database (250).

10 Claims, 4 Drawing Sheets

100

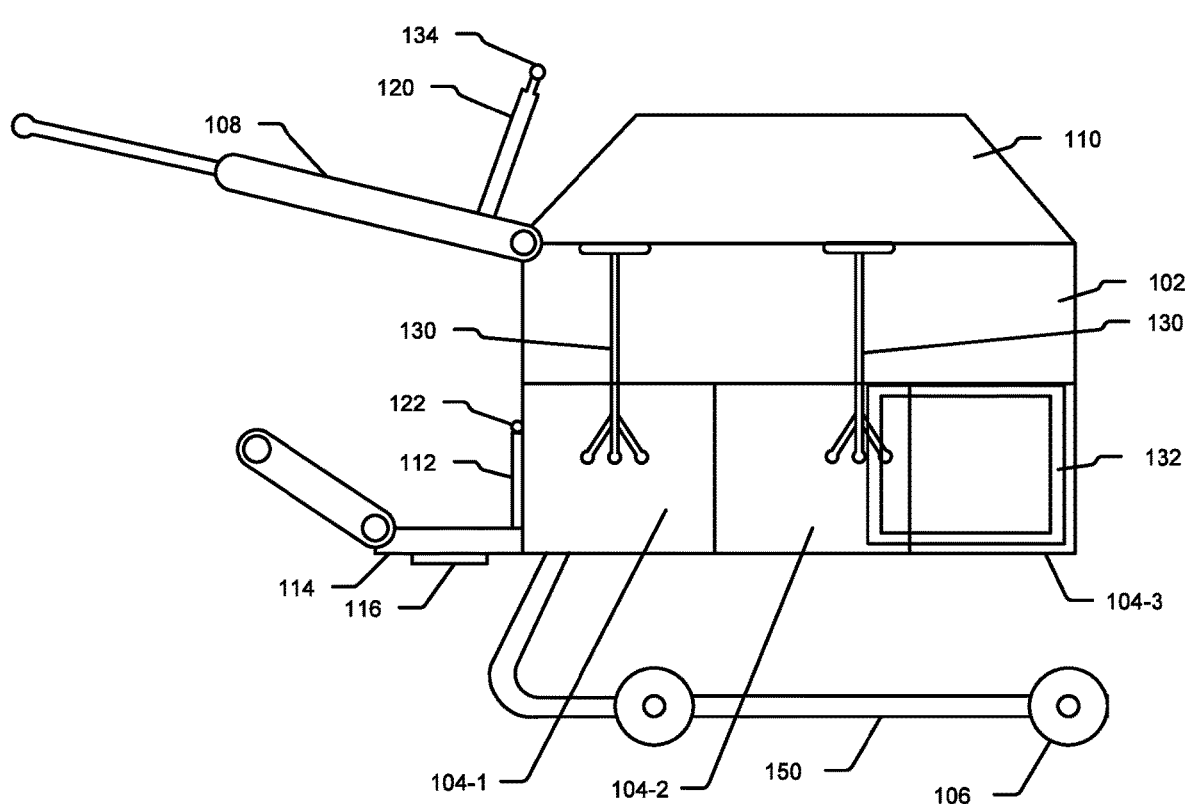
FIG. 1

200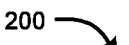

```
┌─────────────────────────────────────────────────────────────────┐
│                       COMPUTING DEVICE                          │
│                            202                                  │
│                                                                 │
│   ┌──────────────┐   ┌──────────────┐   ┌──────────────┐        │
│   │ PROCESSOR(S) │   │   MEMORY     │   │ INTERFACE(S) │        │
│   │     204      │   │     206      │   │     208      │        │
│   └──────────────┘   └──────────────┘   └──────────────┘        │
│                                                                 │
│   ┌─────────────────────────────────────────────────────────┐  │
│   │               PROCESSING ENGINE                         │  │
│   │                     210                                 │  │
│   │                                                         │  │
│   │  ┌──────────────────────┐  ┌──────────────────────┐     │  │
│   │  │ ITEM ATTRIBUTES ENGINE│  │   STORAGE ENGINE     │     │  │
│   │  │        212           │  │        214           │     │  │
│   │  └──────────────────────┘  └──────────────────────┘     │  │
│   │                                                         │  │
│   │  ┌──────────────────────┐  ┌──────────────────────┐     │  │
│   │  │ COMPUTATION ENGINE   │  │ NOTIFICATION ENGINE  │     │  │
│   │  │        216           │  │        218           │     │  │
│   │  └──────────────────────┘  └──────────────────────┘     │  │
│   │                                                         │  │
│   │            ┌──────────────────────┐                     │  │
│   │            │  OTHER ENGINE(S)     │                     │  │
│   │            │        220           │                     │  │
│   │            └──────────────────────┘                     │  │
│   └─────────────────────────────────────────────────────────┘  │
│                                                                 │
│                      ┌──────────────┐                           │
│                      │   DATABASE   │                           │
│                      │     250      │                           │
│                      └──────────────┘                           │
└─────────────────────────────────────────────────────────────────┘
```

FIG. 2

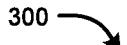

300

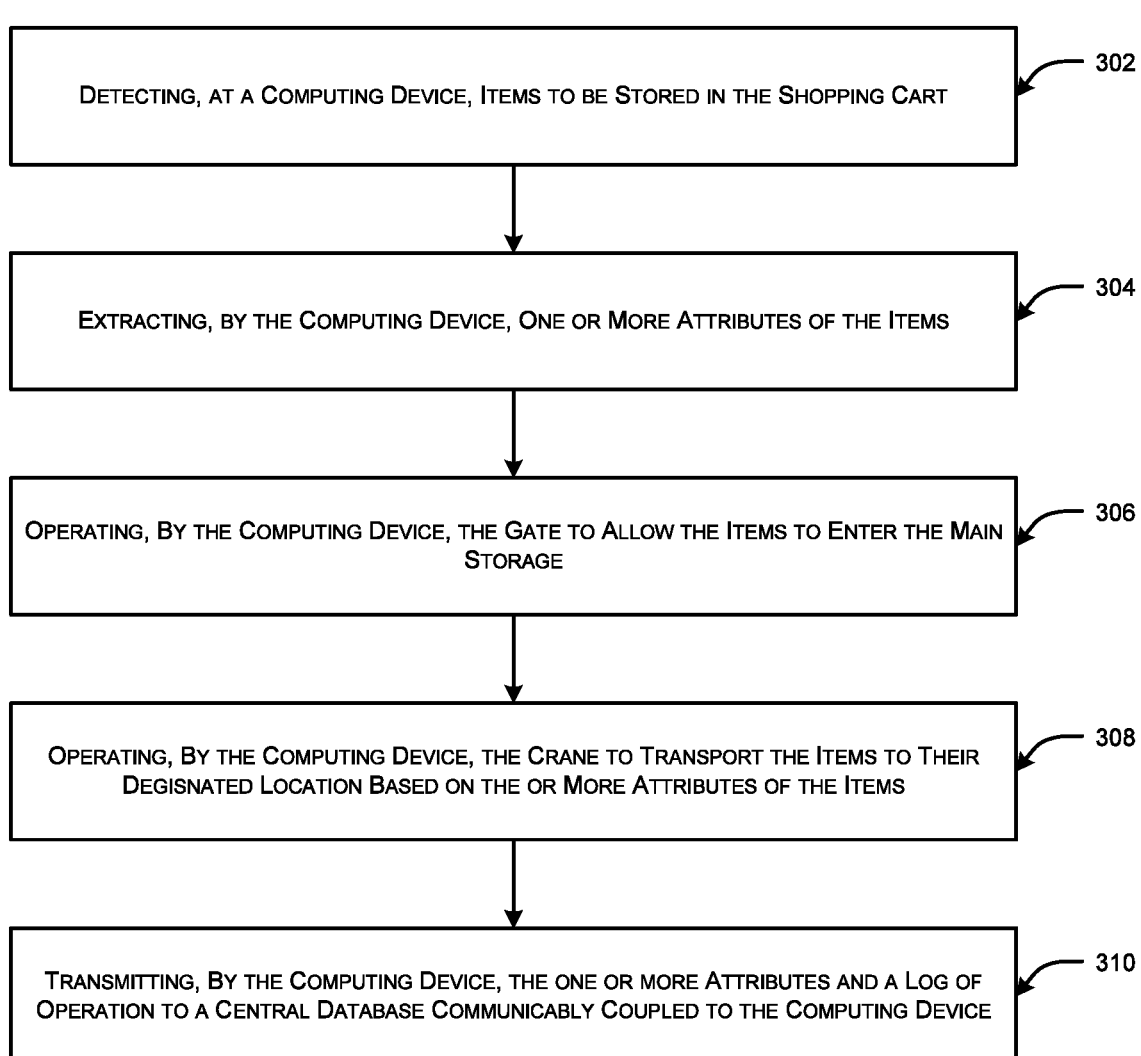

DETECTING, AT A COMPUTING DEVICE, ITEMS TO BE STORED IN THE SHOPPING CART — 302

EXTRACTING, BY THE COMPUTING DEVICE, ONE OR MORE ATTRIBUTES OF THE ITEMS — 304

OPERATING, BY THE COMPUTING DEVICE, THE GATE TO ALLOW THE ITEMS TO ENTER THE MAIN STORAGE — 306

OPERATING, BY THE COMPUTING DEVICE, THE CRANE TO TRANSPORT THE ITEMS TO THEIR DEGISNATED LOCATION BASED ON THE OR MORE ATTRIBUTES OF THE ITEMS — 308

TRANSMITTING, BY THE COMPUTING DEVICE, THE ONE OR MORE ATTRIBUTES AND A LOG OF OPERATION TO A CENTRAL DATABASE COMMUNICABLY COUPLED TO THE COMPUTING DEVICE — 310

FIG. 3

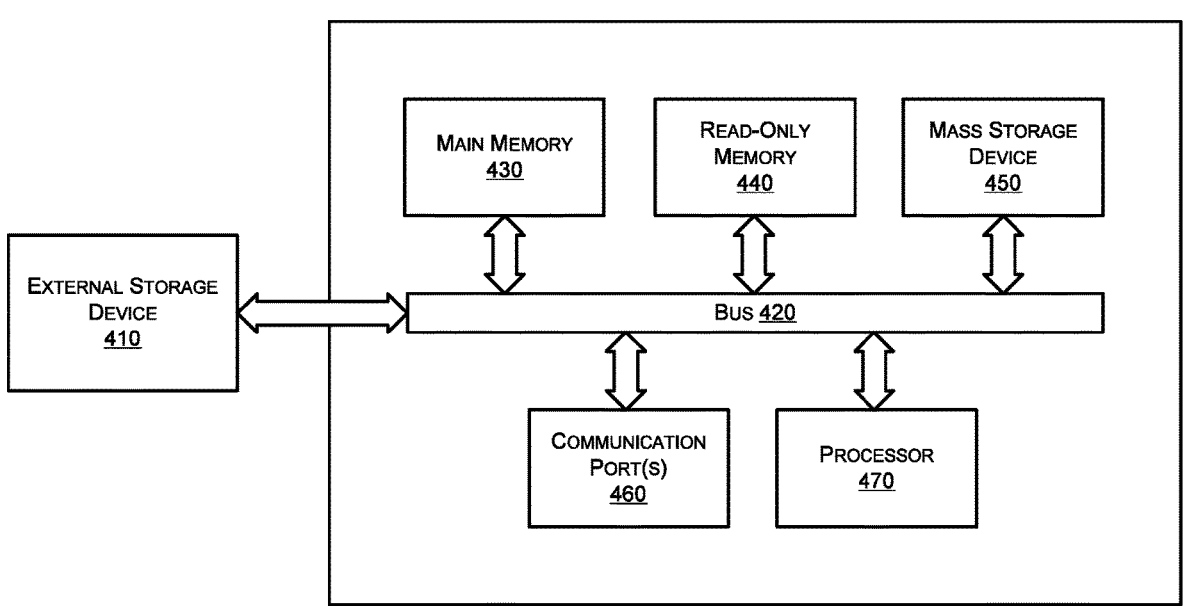
FIG. 4

MULTI-FUNCTIONAL SHOPPING CART, SYSTEM, AND METHOD FOR SHOPPING

TECHNICAL FIELD

The present disclosure relates to shopping of items. In particular, the present disclosure relates to use of a multi-functional shopping cart for shopping of items.

BACKGROUND

Background description includes information that may be useful in understanding the present invention. It is not an admission that any of the information provided herein is prior art or relevant to the presently claimed invention, or that any publication specifically or implicitly referenced is prior art.

Shopping is an almost mandatory activity that many people indulge in. particularly, huge stores such as department stores and malls have made shopping convenient, by providing various items and services that are required for a household or organization. Items available in such shops range from groceries to hardware and stationery.

However, the large number of items available can also make it a hassle to purchase the items and collate it at a single counter during check-out.

There is therefore a requirement for a means to easily handle the purchases made during shopping and to collate the items easily.

OBJECTS OF THE INVENTION

An object of the present invention is to provide a multi-functional shopping cart for shopping.

Another object of the present invention is to provide a means for a user to shop conveniently.

Another object of the present invention is to provide a means for a user to shop items of different types without worry that the items will interact adversely.

Another object of the present invention is to provide a means for a user to shop more efficiently.

SUMMARY

In a first aspect, the present disclosure provides a system for shopping. The system includes a multi-functional shopping cart for shopping. The shopping cart includes a main storage adapted for storage of items. The shopping cart further includes a top cover disposed on top of, and fixedly coupled to the main storage in order to restrict access to the main storage from at least a top of the main storage. The shopping cart further includes a gate provided at the main storage, the gate configured to selectively allow access to the main storage, wherein the gate is configured to allow the items into the main storage. The shopping cart further includes a crane provided within the main storage and configured to pick up items from the gate and move them to a designated location within the main storage. The shopping cart further includes an optical device configured to detect the items. The shopping cart further includes a computing device communicably coupled with the gate, the crane, and the optical device, the computing device comprising a processor communicably coupled with a memory, the memory storing instructions, which when executed by the processor causes the computing device to be configured to: detect the items to be stored in the shopping cart. The computing device is further configured to extract one or more attributes of the items. The computing device is further configured to operate the gate to allow the items to enter the main storage. The computing device is further configured to operate the crane to transport the items to their designated location based on the one or more attributes of the items. The computing device is further configured to transmit the one or more attributes and a log of operations to a central database communicably coupled to the computing device.

In some embodiments, the shopping cart includes a console configured to receive and display information pertaining to the items and a user of the shopping cart.

In some embodiments, the main storage includes one or more compartments, each of the compartments configured to receive the items based on the one or more attributes of the items.

In some embodiments, the one or more compartments are removably coupled to the main storage.

In some embodiments, the shopping cart further includes a conveyor coupled to the gate.

In some embodiments, the shopping cart includes a door disposed on a side of the shopping cart, the door adapted to grant access into the main storage. The door is configured to be locked in its default state. The computing device is configured to operate the door to open upon receiving an open signal. In some embodiments, the open signal is indicative of at least one of a completion of a checkout process of the items in the shopping cart, and an override initiated by an authorized user of the shopping cart.

In some embodiments, the shopping cart further includes one or more cranes provided within the main storage and configured to pick up items from the gate and move them to the designated location within the main storage.

In a second aspect, the present disclosure provides a method for shopping using a multi-functional shopping cart. The method includes detecting, at a computing device items to be stored in the shopping cart. The shopping cart includes a main storage adapted for storage of items. The shopping cart further includes a top cover disposed on top of, and fixedly coupled to the main storage in order to restrict access to the main storage from at least a top of the main storage. The shopping cart further includes a gate provided at the main storage, the gate configured to selectively allow access to the main storage, wherein the gate is configured to allow the items into the main storage. The shopping cart further includes a crane provided within the main storage and configured to pick up items from the gate and move them to a designated location within the main storage. The shopping cart further includes an optical device configured to detect the items. The method further includes extracting, by the computing device one or more attributes of the items. The method further includes operating, by the computing device, the gate to allow the items to enter the main storage. The method further includes operating, by the computing device, the crane to transport the items to their designated location based on the one or more attributes of the items. The method further includes transmitting, by the computing device the one or more attributes and a log of operations to a central database communicably coupled to the computing device.

In a third aspect, the present disclosure provides a multi-functional shopping cart for shopping. The shopping cart includes a main storage adapted for storage of items. The shopping cart further includes a top cover disposed on top of, and fixedly coupled to the main storage in order to restrict access to the main storage from at least a top of the main storage. The shopping cart further includes a gate provided at the main storage, the gate configured to selectively allow access to the main storage, wherein the gate is configured to allow the items into the main storage. The shopping cart further includes a crane provided within the main storage and configured to pick up items from the gate and move them to a designated location within the main storage. The shopping cart further includes an optical device configured to detect the items. The shopping cart further includes a computing device communicably coupled with the gate, the crane, and the optical device, the computing device comprising a processor communicably coupled with a memory, the memory storing instructions, which when executed by the processor causes the computing device to be configured to: detect the items to be stored in the shopping cart. The computing device is further configured to extract one or more attributes of the items. The computing device is further configured to operate the gate to allow the items to enter the main storage. The computing device is further configured to operate the crane to transport the items to their designated location based on the one or more attributes of the items. The computing device is further configured to transmit the one or more attributes and a log of operations to a central database communicably coupled to the computing device.

Various objects, features, aspects, and advantages of the inventive subject matter will become more apparent from the following detailed description of preferred embodiments, along with the accompanying drawing figures in which like numerals represent like components.

BRIEF DESCRIPTION OF DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure.

FIG. 1 illustrates a schematic view of a multi-functional shopping cart for shopping, according to an embodiment of the present disclosure;

FIG. 2 illustrates a schematic block diagram of a system for shopping, according to an embodiment of the present disclosure;

FIG. 3 illustrates a schematic flow diagram for a method for shopping using the shopping cart, according to an embodiment of the present disclosure; and FIG. 4 illustrates an exemplary schematic block diagram of a hardware platform for implementation of the system of FIG. 2.

DETAILED DESCRIPTION

The following is a detailed description of embodiments of the disclosure depicted in the accompanying drawings. The embodiments are in such details as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In a first aspect, the present disclosure provides a system for shopping. The system includes a multi-functional shopping cart for shopping. The shopping cart includes a main storage adapted for storage of items. The shopping cart further includes a top cover disposed on top of, and fixedly coupled to the main storage in order to restrict access to the main storage from at least a top of the main storage. The shopping cart further includes a gate provided at the main storage, the gate configured to selectively allow access to the main storage, wherein the gate is configured to allow the items into the main storage. The shopping cart further includes a crane provided within the main storage and configured to pick up items from the gate and move them to a designated location within the main storage. The shopping cart further includes an optical device configured to detect the items. The shopping cart further includes a computing device communicably coupled with the gate, the crane, and the optical device, the computing device comprising a processor communicably coupled with a memory, the memory storing instructions, which when executed by the processor causes the computing device to be configured to: detect the items to be stored in the shopping cart. The computing device is further configured to extract one or more attributes of the items. The computing device is further configured to operate the gate to allow the items to enter the main storage. The computing device is further configured to operate the crane to transport the items to their designated location based on the one or more attributes of the items. The computing device is further configured to transmit the one or more attributes and a log of operations to a central database communicably coupled to the computing device.

In some embodiments, the shopping cart comprises a console configured to receive and display information pertaining to the items and a user of the shopping cart.

In some embodiments, the main storage comprises one or more compartments, each of the compartments configured to receive the items based on the one or more attributes of the items.

In some embodiments, the one or more compartments are removably coupled to the main storage.

In some embodiments, the shopping cart further comprises a conveyor coupled to the gate.

In some embodiments, the shopping cart includes a door disposed on a side of the shopping cart, the door adapted to grant access into the main storage. The door is configured to be locked in its default state. The computing device is configured to operate the door to open upon receiving an open signal. In some embodiments, the open signal is indicative of at least one of a completion of a checkout process of the items in the shopping cart, and an override initiated by an authorized user of the shopping cart.

In some embodiments, the shopping cart further comprises a weight sensor coupled to the conveyor configured to detect a weight of the items on the conveyor.

In some embodiments, the optical device comprises at least one of a QR code reader, a bar code reader and an object recognition camera.

In some embodiments, the shopping cart further comprises wheels to facilitate movement of the shopping cart.

In some embodiments, the shopping cart further comprises a motor coupled to the wheels to facilitate at least a partial motorization of the wheels of the shopping cart, and wherein the movement of the shopping cart is facilitated by a user of the shopping cart.

In some embodiments, the shopping cart further comprises a power storage device to provide power to the components of the shopping cart.

In some embodiments, one or more attributes of the items comprise at least one of an identity of the items, a quantity of the items, weight of the items, size of the items, and a price of the items.

In some embodiments, the shopping cart further includes one or more cranes provided within the main storage and configured to pick up items from the gate and move them to the designated location within the main storage.

In some embodiments, the computing device is configured to further calculate at least one of a cumulative number of items placed in the shopping cart, and a cumulative weight of the items placed in the shopping cart.

In some embodiments, the computing device is configured to further calculate a cumulative price of the items placed in the shopping cart.

In some embodiments, the computing device is further configured to request, from a user of the shopping cart, a user information pertaining to at least one of user identity, user location, and user communication details. The computing device is further configured to register the user based on the user details provided.

In a second aspect, the present disclosure provides a method for shopping using a multi-functional shopping cart. The method includes detecting, at a computing device items to be stored in the shopping cart. The shopping cart includes a main storage adapted for storage of items. The shopping cart further includes a top cover disposed on top of, and fixedly coupled to the main storage in order to restrict access to the main storage from at least a top of the main storage. The shopping cart further includes a gate provided at the main storage, the gate configured to selectively allow access to the main storage, wherein the gate is configured to allow the items into the main storage. The shopping cart further includes a crane provided within the main storage and configured to pick up items from the gate and move them to a designated location within the main storage. The shopping cart further includes an optical device configured to detect the items. The method further includes extracting, by the computing device one or more attributes of the items. The method further includes operating, by the computing device, the gate to allow the items to enter the main storage. The method further includes operating, by the computing device, the crane to transport the items to their designated location based on the one or more attributes of the items. The method further includes transmitting, by the computing device the one or more attributes and a log of operations to a central database communicably coupled to the computing device.

In a third aspect, the present disclosure provides a multi-functional shopping cart for shopping. The shopping cart includes a main storage adapted for storage of items. The shopping cart further includes a top cover disposed on top of, and fixedly coupled to the main storage in order to restrict access to the main storage from at least a top of the main storage. The shopping cart further includes a gate provided at the main storage, the gate configured to selectively allow access to the main storage, wherein the gate is configured to allow the items into the main storage. The shopping cart further includes a crane provided within the main storage and configured to pick up items from the gate and move them to a designated location within the main storage. The shopping cart further includes an optical device configured to detect the items. The shopping cart further includes a computing device communicably coupled with the gate, the crane, and the optical device, the computing device comprising a processor communicably coupled with a memory, the memory storing instructions, which when executed by the processor causes the computing device to be configured to: detect the items to be stored in the shopping cart. The computing device is further configured to extract one or more attributes of the items. The computing device is further configured to operate the gate to allow the items to enter the main storage. The computing device is further configured to operate the crane to transport the items to their designated location based on the one or more attributes of the items. The computing device is further configured to transmit the one or more attributes and a log of operations to a central database communicably coupled to the computing device.

FIG. 1 illustrates a schematic view of a multi-functional shopping cart 100 for shopping, according to an embodiment of the present disclosure. The cart 100 includes a main storage 102 adapted for storage of items. In some embodiments, the main storage 102 may include one or more compartments 104. The one or more compartments 104 may be adapted for storage of specific types of items. For example, compartment 104-1 may be adapted for storage of dairy products, compartment 104-2 may be adapted for storage of chemical items, compartment 104-3 may be adapted for storage of fruit and vegetable, and so on. The main storage 102 may be made of a strong durable material such as metal frame, or plastic.

In some embodiments, the one or more compartments 104 may be removably provided within the main storage 102. For instance, the one or more compartments 104 may include boxes, such as delivery boxes, which may be placed within the main storage 102. Once the items have been placed in the boxes, the boxes may be sealed off, and directly delivered to a user of the cart 100. In some examples, the box may be lined with plastic or paper bags, such that the items may be directly placed within the paper or plastic bags. The paper or plastic bags may then be removed from the main storage 102 or the compartments 104 and sealed accordingly before being delivered.

The cart 100 is adapted to be mobile. The cart 100 may include wheels 106 and a handle 108 that may be used to move the cart 100. In some embodiments, the cart 100 may be moved manually. In some embodiments, the cart 100 may be partially or fully motorized and the wheels 106 may be driven by an electric motor. Control for the motor may be situated on the handle 108.

The cart 100 further includes a top cover 110 disposed over the main storage 102. The top cover 110 may be transparent and may be made of a material such as plastic or metal frame. The top cover 110 may be fixedly coupled to the main storage 102, so as to restrict access to the main storage 102 from a top side of the main storage 102.

The cart 100 further includes a gate 112 disposed at a rear of the cart 100. The gate 112 may selectively open to provide access to the main storage 102 of the cart 100. The cart 100 further includes a conveyor 114 disposed at the gate 112. Any item may be placed on the conveyor 114, which transports the item towards the gate 112. The conveyor 114 may be coupled to a weight sensor 116, such as a load cell, which is configured to detect a weight of the item placed on the conveyor 114. In some embodiments, the cart 100 may further include an optical device 122 disposed at the gate 112. The optical device 122 may be configured to detect the items before the items enter the gate 112. The optical device 122 may be at least one of a QR code reader, a bar code reader, and an object recognition camera. The optical device 122 may detect one or more attributes of the items. The one or more attributes of the items may be at least one of an identity of the items, a quantity of the items, weight of the items, size of the items, and a price of the items.

The conveyor 114, the gate 112, and the optical device 122 may be operable based on instruction provided by a computing device 202, such as a controller. The computing device 202 may be part of a console 120 provided proximal to the handle 108 of the cart 100. The console 120 may further include a second optical device 134 configured to detect the items. The second optical device 134 may be at least one of a QR code reader, a bar code reader, and an object recognition camera. The second optical device 134 may detect one or more attributes of the items.

The cart 100 further includes a crane 130 provided within the main storage 102. The crane 130 is configured to pick up items from the gate 112 and move them to a designated location within the main storage 102. The designated storage may be any one of the compartments 104. The crane 130 may transport the items to the designated location based on one or more attributes of the items. In some embodiments, the cart 100 may include one or more cranes 130 that may be configured to work independently of one another. The one or more cranes 130 may be configured to pick up corresponding one or more items from the gate 112 and move them to the designated location within the main storage 102.

In some embodiments, the cart 100 further includes a door 132 disposed on a side of the cart 100. The door 132 is adapted to grant access into the main storage 102. The door 132 is configured to be locked in its default state. In some embodiments, the computing device 202 is configured to operate the door 132 to open upon receiving an open signal. In some embodiments, the open signal is indicative of at least one of a completion of a checkout process of the items in the cart 100, and an override initiated by an authorized user of the cart 100. When the door 132 is open, the user may access the main storage 102 to recover the items in the main storage 102.

For example, the open signal may be generated once checkout is completed and the items in the cart 100 have been paid for. However, in some examples, the open signal may be generated due to some potential error, such as a mechanical, or an electro-mechanical error that may prevent the door 132 from being opened. An authorized user, for example, an employee of a store in which the cart 100 is being used, may be able to override access to open the door 132.

As a result, the cart 100 allows selective access to the user to the inside of the main storage 102 where the items are held. Once the items are placed in the cart 100, they may be removed only at a time after the completion of the checkout of the items placed in the cart 100. Until such time the checkout process is not complete, the user may not be able to access the items within the cart 100.

In some examples, the cart 100 may include a platform 150 provided at a base of the cart 100. Some items that are too heavy or large to be placed within the main storage 102 may be placed on the platform 150.

FIG. 2 illustrates a schematic block diagram of a system 200 for shopping, according to an embodiment of the present disclosure. The system 200 includes the shopping cart 100. Specifically, FIG. 2 illustrates a schematic block diagram of the computing device 202. The computing device 202 includes a processor 204 communicably coupled with a memory 206. The memory 206 stores instructions which when executed by the processor 204 causing the computing device 202 to assist a user to operate the shopping cart 100 for shopping.

In some embodiments, the processor 204 may be implemented as one or more microprocessors, microcomputers, microcontrollers, digital signal processors, central processing units, logic circuitries, and/or any devices that process data based on operational instructions. Among other capabilities, the processor 204 may be configured to fetch and execute computer-readable instructions stored in the memory 206 for facilitating the system 200 to assist a user to operate the shopping cart 100 for shopping. Any reference to a task in the present disclosure may refer to an operation being or that may be performed on data. The memory 206 may be configured to store one or more computer-readable instructions or routines in a non-transitory computer readable storage medium for assisting a user to operate the shopping cart 100 for shopping. The memory 206 may include any non-transitory storage device including, for example, volatile memory such as RAM, or non-volatile memory such as EPROM, flash memory, and the like. In some embodiments, the computing device 202 may include an interface 208. The interface 208 may include a variety of interfaces, for example, interfaces for data input and output devices, referred to as I/O devices, storage devices, and the like. The interface 208 may also provide a communication pathway for one or more components of the computing device 202. Examples of such components include, but are not limited to, a processing engine 210 and a database 250.

In some embodiments, the computing device 202 includes the processing engine 210. The processing engine 210 may be implemented as a combination of hardware and programming (for example, programmable instructions) to implement one or more functionalities of the processing engine 210. In examples described herein, such combinations of hardware and programming may be implemented in several different ways. For example, the programming for the processing engine 210 may be processor executable instructions stored on a non-transitory machine-readable storage medium and the hardware for the processing engine 210 may include a processing resource (for example, one or more processors), to execute such instructions. In the present examples, the machine-readable storage medium may store instructions that, when executed by the processing resource, implement the processing engine 210. In such examples, the computing device 202 may include the machine-readable storage medium storing the instructions and the processing resource to execute the instructions, or the machine-readable storage medium may be separate but accessible to the computing device 202 and the processing resource. In other examples, the processing engine 210 may be implemented by electronic circuitry.

In some embodiments, the processing engine 210 may include an item attributes engine 212, a storage engine 214, a computation engine 216, a notification engine 218, and other engine(s) 220.

The item attributes engine 212 is configured to detect the items to be stored in the cart 100. The item attributes engine 212 is further configured to extract the one or more attributes of the items. The one or more attributes may be at least one of the identity of the items, the quantity of the items, the weight of the items, size of the items, and a price of the items. For example, the identity, quantity, and price of the items may be obtained from the bar code or QR code present on the items that may be scanned by the optical device 122. The weight of the items may be obtained by the weight sensor 116.

The storage engine 214 is configured to operate the conveyor 114 when the items are placed on it. For instance, presence of the items on the conveyor 114 may be detected by the weight sensor 116. Once the conveyor 114 is operated, the storage engine 214 is further configured to open the gate 112 to allow the items into the main storage 102. Based on the attributes of the items allowed into the main storage 102, the storage engine 214 is further configured to operate the crane 130 in order to pick up the items and transport them to their designated location in the main storage 102.

The computation engine 216 is configured to calculate at least one of a cumulative number of items placed in the cart 100, and a cumulative weight of the items placed in the cart 100. The computation engine 216 is further configured to calculate a cumulative price of the items placed in the cart 100.

The notification engine 218 is configured to transmit information to the user of the cart 100 and to a database 250 communicably coupled to the computing device 202. The information may relate to the cumulative weight of the items placed in the cart 100 or to the cumulative price of the items placed in the cart 100. The information may be conveyed to the user via a display provided on the console. The information may be provided to an organization, such as the shopping store where the user is, for billing and/or delivery purposes.

The other engine(s) 220 may include engines configured to perform one or more functions ancillary functions associated with the processing engine 210.

The processing engine 210 may further be configured to register the user. The user may be registered by providing user details such as username, user address, user communication details, etc. in order to register. The user may also provide payment details, and other preferences. For example, the user may provide payment preferences, preferred address for delivery, or a preferred configuration for storage of the items within the cart 100, including designated locations for the items.

FIG. 3 illustrates a schematic flow diagram for a method 300 for shopping using the shopping cart 100, according to an embodiment of the present disclosure. At step 302, the method 300 includes detecting, at the computing device 202, items to be stored in the cart 100. At step 304, the method 300 further includes extracting, by the computing device 202, one or more attributes of the items. At step 306, the method 300 further includes operating, by the computing device 202, the gate 112 to allow the items to enter the main storage 102. At step 308, the method 300 further includes operating, by the computing device 202, the crane 130 to transport the items to their designated location based on the one or more attributes of the items. At step 310, the method 300 further includes transmitting, by the computing device 202, the one or more attributes and a log of operations to the central database 250 communicably coupled to the computing device 202.

FIG. 4 illustrates an exemplary schematic block diagram of a hardware platform for implementation of the system 200. As shown in FIG. 4, a computer system 400 can include an external storage device 410, a bus 420, a main memory 430, a read only memory 440, a mass storage device 450, communication port 460, and a processor 470. A person skilled in the art will appreciate that the computer system may include more than one processor and communication ports. Examples of processor 470 include, but are not limited to, an Intel® Itanium® or Itanium 2 processor(s), or AMD® Opteron® or Athlon MP® processor(s), Motorola® lines of processors, FortiSOC™ system on chip processors or other future processors. Processor 470 may include various modules associated with embodiments of the present invention. Communication port 460 can be any of an RS-232 port for use with a modem-based dialup connection, a 10/100 Ethernet port, a Gigabit or 10 Gigabit port using copper or fibre, a serial port, a parallel port, or other existing or future ports. Communication port 460 may be chosen depending on a network, such a Local Area Network (LAN), Wide Area Network (WAN), or any network to which computer system connects. Memory 430 can be Random Access Memory (RAM), or any other dynamic storage device commonly known in the art. Read-only memory 440 can be any static storage device(s) e.g., but not limited to, a Programmable Read Only Memory (PROM) chips for storing static information e.g., start-up or BIOS instructions for processor 470. Mass storage 450 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7102 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 420 communicatively couples processor(s) 470 with the other memory, storage, and communication blocks. Bus 420 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 470 to software system.

Optionally, operator and administrative interfaces, e.g., a display, keyboard, and a cursor control device, may also be coupled to bus 420 to support direct operator interaction with a computer system. Other operator and administrative interfaces can be provided through network connections connected through communication port 460. The external storage device 410 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprise" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

ADVANTAGES OF THE INVENTION

The present invention provides a shopping cart for shopping.

The present invention provides a means for a user to shop conveniently.

The present invention provides a means for a user to shop items of different types without worry that the items will interact adversely.

The present invention provides a means for a user to shop more efficiently.

I claim:

1. A system for shopping comprising a multi-functional shopping cart, the shopping cart comprising:
   a main storage adapted for storage of items;
   a top cover disposed on top of, and fixedly coupled to the main storage in order to restrict access to the main storage at least from a top of the main storage;
   a gate provided at the main storage and configured to selectively allow access to the main storage, wherein the gate is configured to receive items transported to the gate and allow the items into the main storage;
   a crane provided within the main storage and configured to pick up items from the gate and move them to a designated location within the main storage; and
   an optical device configured to detect the items; and
   a computing device communicably coupled with the gate, the crane, and the optical device, the computing device comprising a processor communicably coupled with a memory configured for storing instructions, which, when executed by the processor, causes the computing device to be configured to:
   detect the items to be stored in the shopping cart;
   extract one or more attributes of the items;
   operate the gate to allow the items to enter the main storage;
   operate the crane to transport the items to their designated location based on the one or more attributes of the items; and
   transmit the one or more attributes and a log of operations to a central database communicably coupled to the computing device.

2. The system as claimed in claim 1, wherein the shopping cart comprises a console configured to receive and display information pertaining to the items and a user of the shopping cart.

3. The system as claimed in claim 1, wherein the main storage comprises one or more compartments, each of the compartments configured to receive the items based on the one or more attributes of the items.

4. The system as claimed in claim 3, wherein the one or more compartments are removably coupled to the main storage.

5. The system as claimed in claim 1, wherein the shopping cart further comprises a conveyor coupled to the gate, the conveyor configured to transport the items to the gate.

6. The system as claimed in claim 1, wherein the shopping cart comprises a door disposed on a side of the shopping cart, the door adapted to grant access into the main storage, wherein the door is configured to be locked in its default state, and wherein the computing device is configured to operate the door to open upon receiving an open signal.

7. The system as claimed in claim 6, wherein the open signal is indicative of at least one of a completion of a checkout process of the items in the shopping cart, and an override initiated by an authorized user of the shopping cart.

8. The system as claimed in claim 1, wherein the shopping cart further comprises one or more cranes provided within the main storage and configured to pick up items from the gate and move them to a designated location within the main storage.

9. A method for shopping using a multi-functional shopping cart, the method comprising:
   detecting, at a computing device, items to be stored in the shopping cart, wherein the shopping cart comprises:
   a main storage adapted for storage of items;
   a top cover disposed on top of, and fixedly coupled to the main storage in order to restrict access to the main storage at least from a top of the main storage;
   a gate provided at the main storage, the gate configured to selectively allow access to the main storage, wherein the gate is configured to receive items transported to the gate and allow the items into the main storage;
   a crane provided within the main storage and configured to pick up items from the gate and move them to a designated location within the main storage; and
   an optical device configured to detect the items;
   extracting, by the computing device, one or more attributes of the items;
   operating, by the computing device, the gate to allow the items to enter the main storage;
   operating, by the computing device, the crane to transport the items to their designated location based on the one or more attributes of the items; and
   transmitting, by the computing device, the one or more attributes and a log of operations to a central database communicably coupled to the computing device.

10. A multi-functional shopping cart for shopping, the shopping cart comprising:
    a main storage adapted for storage of items;
    a top cover disposed on top of, and fixedly coupled to the main storage in order to restrict access to the main storage at least from a top of the main storage;
    a gate provided at the main storage, the gate configured to selectively allow access to the main storage, wherein the gate is configured to receive items transported to the gate and allow the items into the main storage;
    a crane provided within the main storage and configured to pick up items from the gate and move them to a designated location within the main storage;
    an optical device configured to detect the items; and
    a computing device communicably coupled with the gate, the crane, and the optical device, the computing device comprising a processor communicably coupled with a memory, the memory storing instructions, which when executed by the processor causes the computing device to be configured to:
    detect the items to be stored in the shopping cart;
    extract one or more attributes of the items;

operate the gate to allow the items to enter the main storage;

operate the crane to transport the items to their designated location based on the one or more attributes of the items; and transmit the one or more attributes and a log of operations to a central database communicably coupled to the computing device.

\* \* \* \* \*